US005790425A

United States Patent [19]
Wagle

[11] Patent Number: 5,790,425
[45] Date of Patent: Aug. 4, 1998

[54] GENERIC SERVER BENCHMARKING FRAMEWORK IN A CLIENT-SERVER ENVIRONMENT

[75] Inventor: Prasad Wagle, Mountain View, Calif.

[73] Assignee: Sun Microsystems, Inc., Mountain View, Calif.

[21] Appl. No.: 800,526

[22] Filed: Feb. 19, 1997

[51] Int. Cl.[6] .................................................. G06F 11/34
[52] U.S. Cl. .............................. 364/551.01; 395/200.42
[58] Field of Search ............................ 364/551.01, 514; 395/185.07, 200.48, 200.49, 200.54

[56] References Cited

U.S. PATENT DOCUMENTS

| | | |
|---|---|---|
| 5,303,166 | 4/1994 | Amalfitano et al. . |
| 5,379,430 | 1/1995 | Nguyen . |
| 5,396,626 | 3/1995 | Nguyen . |
| 5,421,013 | 5/1995 | Smith . |
| 5,446,874 | 8/1995 | Waclawsky et al. . |
| 5,537,542 | 7/1996 | Eilert et al. . |
| 5,557,740 | 9/1996 | Johnson et al. . |
| 5,642,504 | 6/1997 | Shiga . |
| 5,696,701 | 12/1997 | Burgess et al. . |

OTHER PUBLICATIONS

Laddis: The Next Generation In NFS File Server Benchmarking, Mark White and Bruce E. Keith, Apr. 1993, pp. 1–27.

The Java Language Environment, James Gosling and Henry McGilton, May 1995, pp. 1–65.

Answers to Frequently Asked Questions about SPEC Benchmarks, Sep. 11, 1995.

Don Binns, Graphical Tool for Developing in Java, PC User, n 289, p. 24+, Aug. 21, 1996.

Unattributed, Sun Delivers Faster Java Applications Edge: Work–Group Computing Report, Dec. 16, 1996.

Ken North, Perfromance Testing, ODBC, and Native SQL APIs Dr. Dobb's Journal v21 n13 p. 17+, Jan. 1996.

Lisa DiCarlo, 2D Lab Adds RISC Support to Test Suite PCWeek v13 n14 p. 43+, Apr. 1996.

*Primary Examiner*—James P. Trammell
*Assistant Examiner*—Craig Steven Miller
*Attorney, Agent, or Firm*—Blakely Sokoloff Taylor & Zafman

[57] ABSTRACT

A computer implemented framework method for server benchmarking in a client server environment including a server and at least one client system is provided. The method includes the steps of: activating a benchmark manager application program; activating, by the benchmark manager, a benchmark prime program; activating, by the prime program, a system independent benchmark client program; generating, by the client program, at least one workload request to the server; and measuring the server's response to the at least one workload request.

20 Claims, 5 Drawing Sheets

GENERIC SERVER BENCHMARKING FRAMEWORK IN A CLIENT-SERVER ENVIRONMENT

BACKGROUND OF THE INVENTION (1) Field of the Invention

The present invention relates in general to performance measurement within a data processing system. More specifically, the present invention relates to server benchmarking in a client-server environment.

(2) Description of the Related Art

Performance monitoring systems in connection with computer hardware and software systems are well known in the art. Such performance monitoring systems typically include hardware and software residing in server and client systems serviced by a server. The ability to compare the performance of various server configurations from several vendors is critical when selecting a server.

Typically a server benchmark includes one or more programs used to measure the response of the server to requests issued by the various clients coupled to the server via a network. The benchmark is executed concurrently on one or more client systems, located on one or more networks connected to the file server under test. The benchmark measures the request response time and throughput capacity of a file server. The client systems send a controlled stream of requests, i.e. workloads, to the server, according to a specific operation mix and file access distribution, allowing precise measurement of the server's response time for each request. The workload generated by the benchmark can be based on several independent studies of file servers in software development environments conducted by both academia and industry vendors. The workload is also based on heuristics in the absence of hard workload data. Workload parameters can include an operation mix which specifies relative frequencies of individual operators. The benchmark produces response time versus throughput measurements for the various workloads. Generally, aside from basic server configuration requirements, a server benchmark is not concerned with how the file server provides service—the benchmark measures the server as if it were a black box.

A typical server benchmark measures the response time of the server when workloads are generated by a workload generator using client operating system clock routines. The benchmark formulates remote procedures call (RPC) packets and measures server response time on entry and exit from the user-space RPC library calls used to send and receive network packets. Such benchmarks implement a protocol used across the network.

The conventional benchmark components include a set of generators that create a request load (workload), a central manager program which coordinates execution of the benchmark, and the server under test. The benchmark components execute on systems configured as clients on the file server. FIG. 1 shows an illustrative example of a multi-client benchmark testbed configuration with six client/load generators 2, distributed over two Local Area Network (LAN1 and LAN2) segments 6 and 4, accessing a file server 8. In a multi-client environment, multiple clients execute a benchmark at the same time to generate a load to the server. A manager process 10 may be executed on a separate system (prime client), or on one of the client/load generators 2, to control the tests on the clients and to produce aggregate results of the multi-client sum. A master shell script within the manager reads a benchmark input parameter file, and then spawns a remote shell script on each of the client/load generators 2 participating in the benchmark run. These shell scripts handle benchmark output, create log and error files, and spawn the various distributed processes involved in executing the benchmark. The system that controls the test is called prime-client. The manager process 10 running on the prime client, controls the various phases of the benchmark and consolidates performance results from each load generator. The prime client can also execute the benchmark load generating code at the same time it is performing multi-client management.

The prime client also includes a process responsible for synchronizing the load generators while the benchmark is running. During the load generation phase of the benchmark, multiple load-generating processes executing on each client/load generator send a request to the file server. The file server executes the request and responds to the client/load generator that generated the request. The client, based on the response of the file server, updates a file which contains the parameter measured by the benchmark, such as the response time of the server. The client/load generators need not be equipped identically, be the same model or even be made by the same vendor. The requirement for the client's programs is to have enough load generators to saturate the file server's ability to service requests.

Conventional benchmarks implement a protocol within the benchmark. This design enables the benchmark to monitor the requests sent to the file server. Also, in such conventional benchmarks, the workload is an integral part of the benchmark. This makes it difficult to experiment with different workloads or adapt the benchmark to different protocols. Accordingly, a conventional design approach imposes a burden on using the benchmark in conjunction with different hardware and software platforms implemented by the client systems. For these reasons, it is desirable to provide a benchmark framework which is system independent and which can be used in conjunction with different client architectures.

BRIEF SUMMARY OF THE INVENTION

The present invention provides a computer implemented framework method for server benchmarking in a client server environment including a server and at least one client system. The method includes the steps of: activating a benchmark manager application program; activating, by the benchmark manager, a benchmark prime program; activating, by the prime program, a system independent benchmark client program; generating, by the client program, at least one workload request to the server; and measuring the server's response to the at least one workload request.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, specific steps, procedures, command options, command items, and other specifics are set forth in order to provide a thorough understanding of the present invention. However, it will be apparent to one skilled in the art that the present invention may be practiced without these specific details. In other instances, well-known systems and methods are shown in diagrammatic block or flow diagram form to avoid obscuring the present invention.

Figure 1:
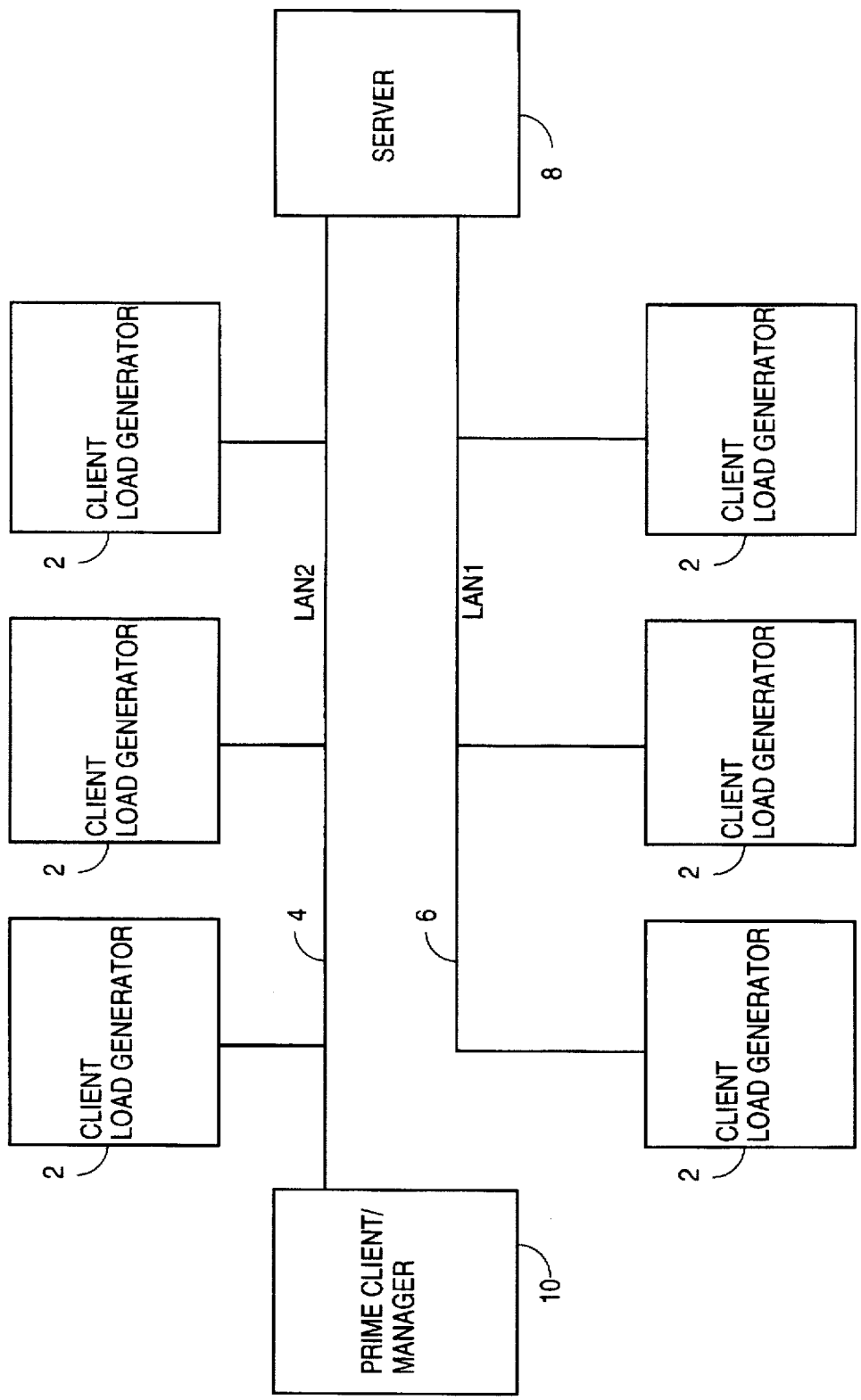
FIG. 1 illustrates a block diagram representation of a multiple-client benchmark test bed configuration.
Figure 2:
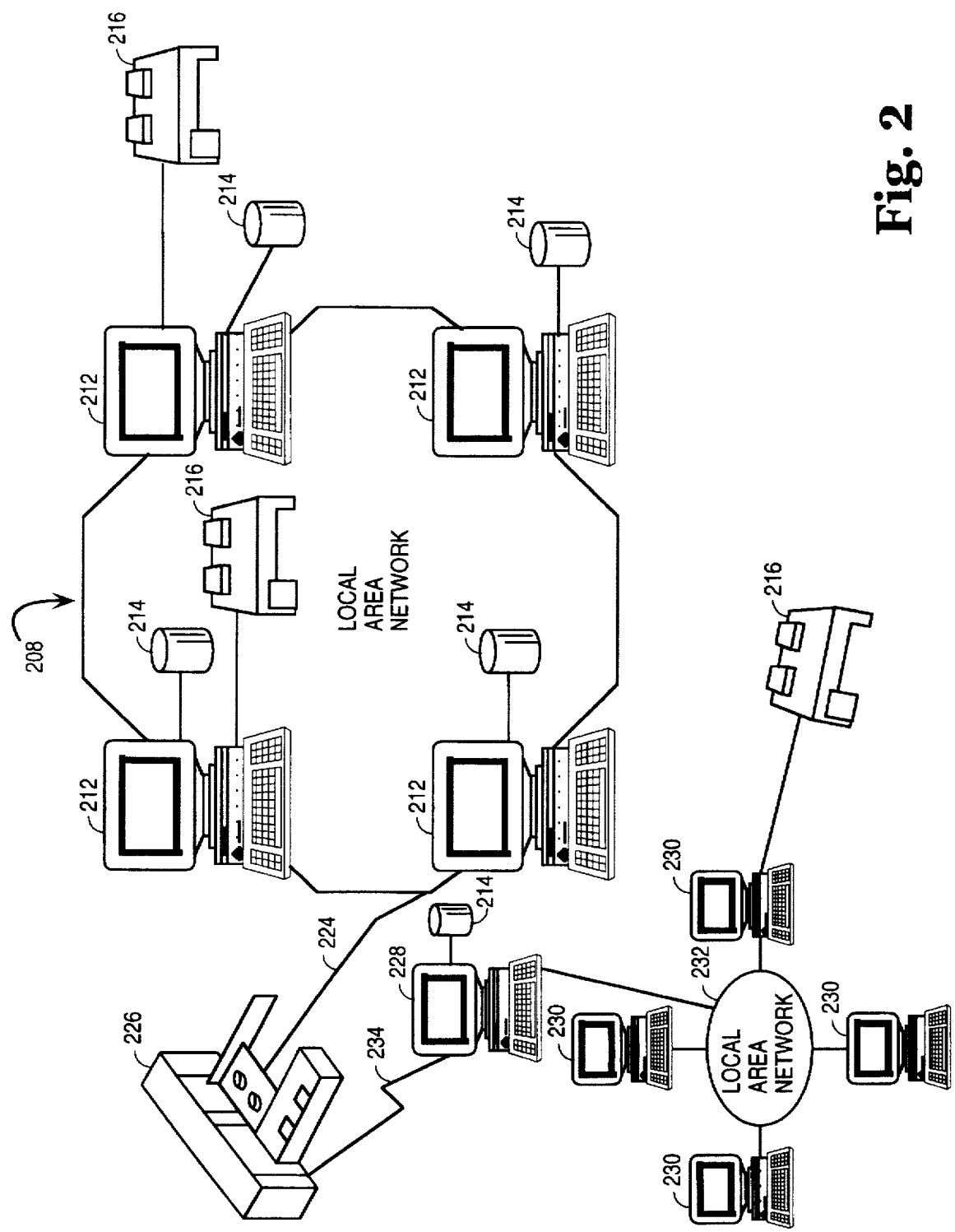
FIG. 2 diagrammatically illustrates a data processing network implementing the framework server benchmark according to the present invention.

FIG. 2 illustrates diagrammatically a data processing network 208 which may be utilized in conjunction with the method and system according to the present invention. Data processing network 208 may include a plurality of networks, such as Local Area Networks (LANs) 210 and 232. Each of the LANs 210 and 232 preferably includes a plurality of individual terminals 212 and 230, respectively. Of course, those skilled in the art will appreciate that terminals 212 and 230 may be implemented utilizing a plurality of personal computers or a plurality of work stations. As it is common in such data processing networks, each individual terminal/computer may be coupled to a storage device 214 and/or a printer/output device 216. One such storage device 214 may be utilized to store data which is later utilized to generate performance analysis reports which may be created in accordance with the method and system of the present invention in a manner which will be explained in greater detail herein. A server 228 under test in conjunction with which a method and system for performing a benchmark performance analysis is utilized, is coupled to LANs 210 and 222. Server 228 is shown coupled to LAN 210 via a communications controller 226 and communications link 234. Server 228 is directly coupled to LAN 210 shown in FIG. 3.

Figure 3:
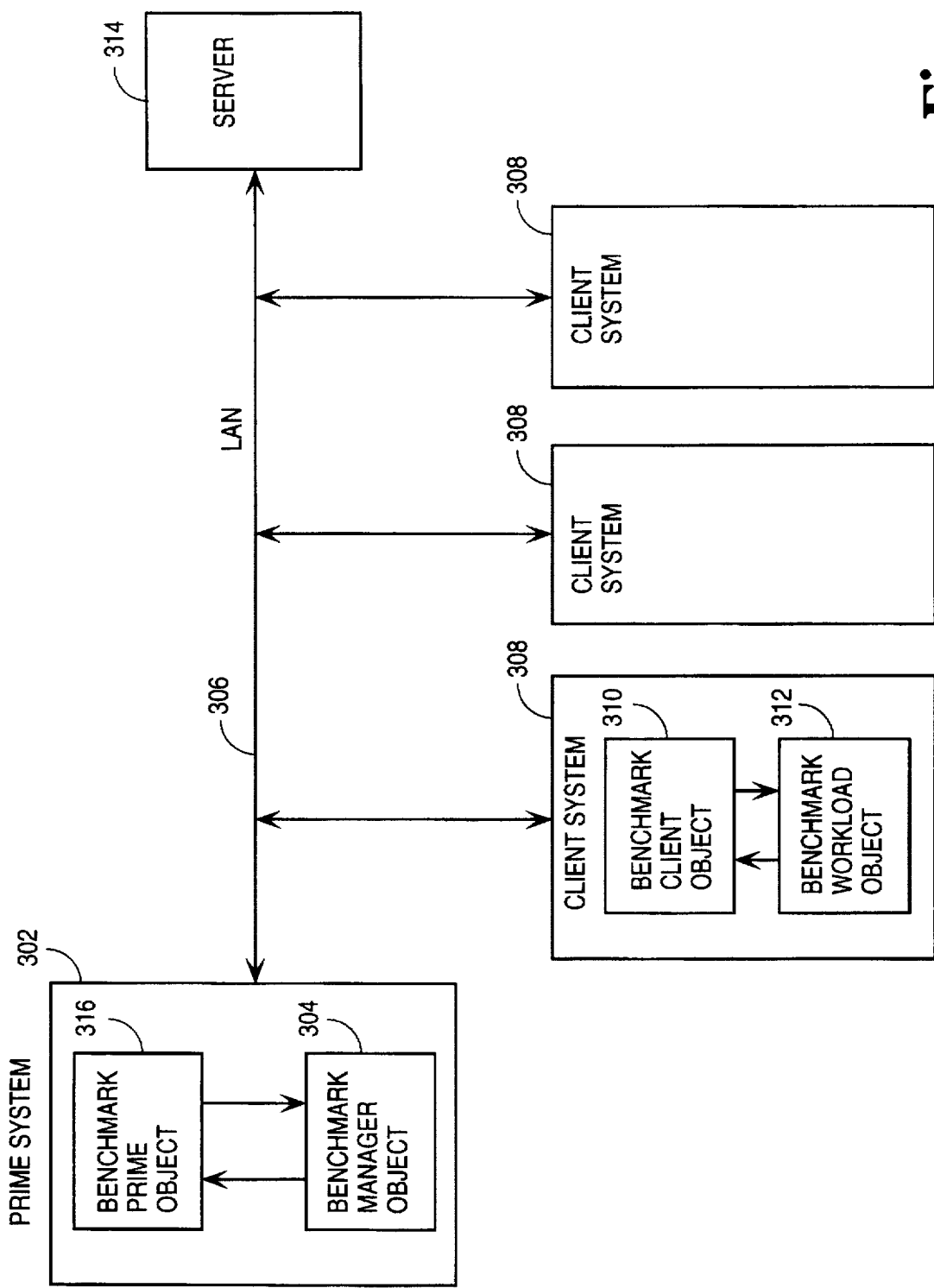
FIG. 3 diagrammatically illustrates a client-server system implementing a framework process for server benchmarking according to the present invention.

A server benchmarking framework process according to the present invention can be used in conjunction with the server-client system illustrated in FIG. 3. The server-client system of FIG. 3 illustrates a prime-client system 302 which includes a prime application program 316 and a manager application program 304. Hereinafter the prime application program is denominated as prime object and the manager application program is denominated as manager object. The prime system 302 can be implemented either on a separate system or on one of the client systems such as 308. Client systems 308 are coupled to the prime system 302 via the LAN 306. A server 314 under test is coupled to the client systems 308 and to the prime system 302 also via the LAN 306. A client system 308 includes a benchmark client object 310 and a benchmark workload object 312. The client benchmark object 310 is an application program which runs on the client system and generates the benchmark workload object 312 in response to a command received from the benchmark prime-object 316. The client object 310 and the benchmark workload object 312 may be stored in a storage device such as a mass storage device.

The benchmark client object 310 and the benchmark workload object 312 are separated in the client system 308. The benchmark framework process, according to the present invention, separates the multi-client execution and workload components by defining a workload application programming interface (API). This makes it easy to develop various client-server protocol benchmarks and experiment with different workloads.

Figure 4:
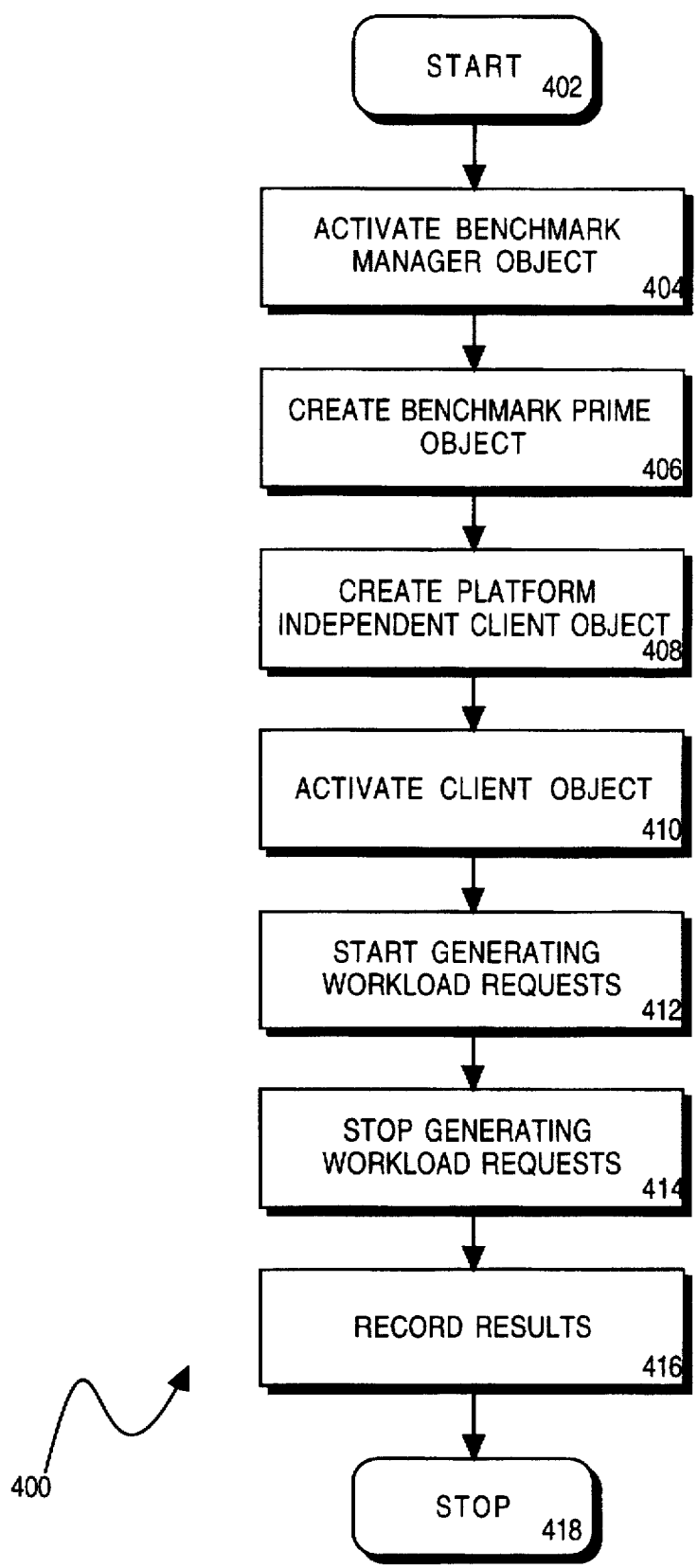
FIG. 4 illustrates a process according to the present invention for server benchmarking.

With reference now to FIG. 4, flowchart diagram 400 illustrates a process for server benchmarking according to the present invention. The process 400 begins at block 402 and thereafter passes to block 404 which depicts the step of activating a benchmark manager object. At this step, the benchmark manager object, illustrated in FIG. 3 as 304, is started on the prime-system 302 of FIG. 3. Typically, a user indicates to the manager what server to benchmark, what are the client systems running the benchmark, what is the load per client, and what are the workload parameters. The manager object controls the various phases of the benchmark and starts a prime program on the prime client system and a client program on the client systems. The process, according to the present invention, then passes to block 406 where the benchmark manager object starts the benchmark prime-object 316 of FIG. 3. Next, the process passes to block 408 where the benchmark prime-object creates a platform-independent benchmark client object in each client system. Typically, the benchmark prime object or prime program which runs on the prime client synchronizes the execution of the benchmark client programs on different clients. The prime program indicates to the benchmark client object when to initialize, when to start and stop a warm-up phase, when to start and stop a benchmark run, and when to send results to the prime system. The prime program also consolidates performance results from the benchmark object clients.

The platform-independent benchmark client objects are programs which are typically written in a platform-independent programming language. The benchmark client object is written in one such language which, by way of non-limiting example, is Java. Java is an interpreted object-oriented programming language environment created by Sun Microsystems, Inc. of Mountain View, Calif. For more information with respect to Java see *Java Language Environment, A White Paper* by James Gosling and Henry Macgilten, published by Sun Microsystems, Inc.

Typically, the client platform-independent programs are initially written in Java source. The benchmark client program includes an interface made of object-oriented methods. "Methods" are objected-oriented components which define an object's "behavior." Methods manipulate the instance variables to create a new state and new objects. The instance variables define an object's state. In the process 400, according to the present invention, the client program's methods are defined to support operations that the benchmark prime object and the benchmark manager object are performing in connection with the client. Such operations include the functions: client.create, client.start, client.get results, client.stop., etc. The source is then passed to a Java compiler which generates Java byte codes. The byte codes then move through the network through the LAN illustrated in FIG. 3 to the client systems. The client systems include a Java interpreter which translates the Java byte codes into machine code. Accordingly, the present invention provides for a framework for server benchmarking implemented on various systems independent of the software platform running in the client systems.

The benchmarking process according to the present invention passes from block 408 to block 410 where the prime-object activates each client program on the different client systems 308 of FIG. 3. Typically, the activation of a client program includes initializing the client program. The process then passes to block 412 where the client starts generating workload requests. Typically, the client programs create workload objects. The clients then pass parameters to the workload objects, activate the workload objects which in response generate requests to the server. Upon the server's response to the workload request, the client program updates a benchmark results file which typically includes the number of operations per second that the server executed and the average response time. During a benchmark run the following parameters by way of non-limiting example, are specified: run time, warm-up time, and a file with a workload specification. At block 414, the process, according to the present invention, stops generating the workload requests. The process then passes to block 416 where the results are recorded and finally to block 418 where the process ends.

Figure 5:
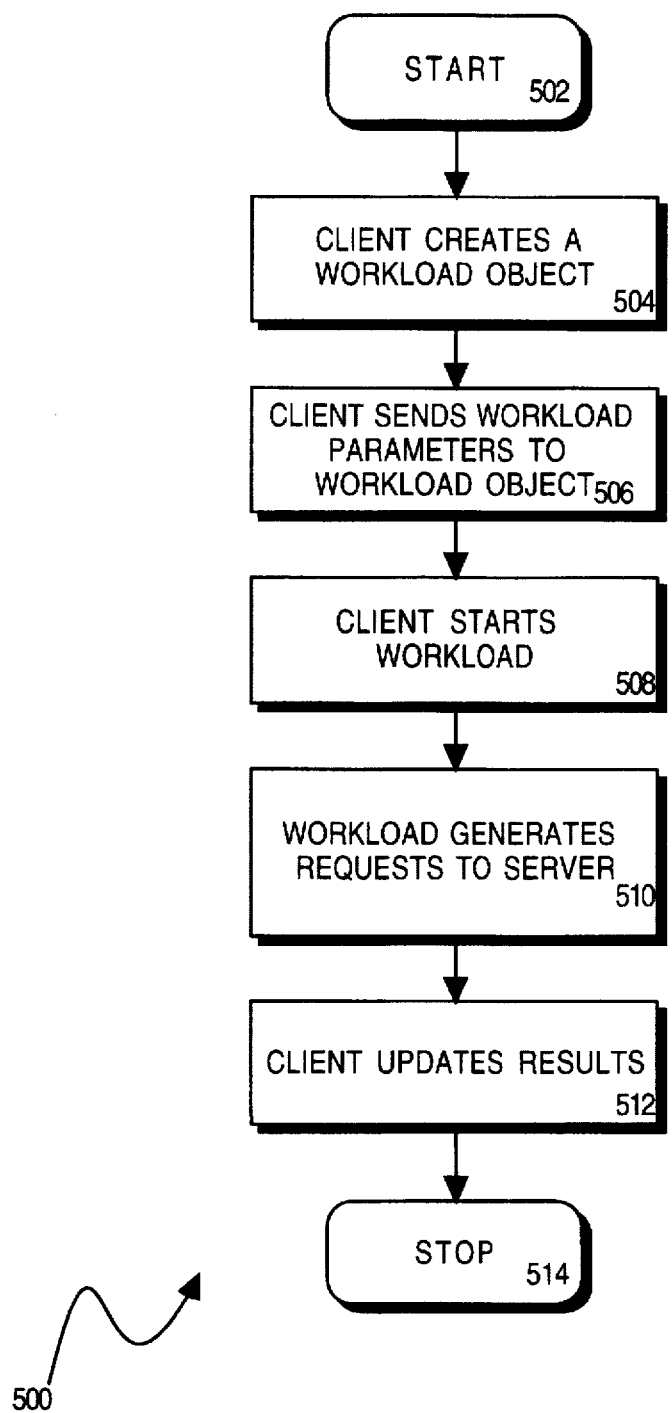
FIG. 5 illustrates a process according to the present invention for generating workload requests to the server.

FIG. 5 illustrates a process for generating workload requests to the server. The process starts at block 502 and passes to block 504 where client systems create a benchmark workload object. In such way the workload object, according to the present application, is separated from the client object as opposed to being an integral part of the client object as in conventional benchmarking applications. The framework server benchmarking process, according to the present invention, separates client execution and workload components. At block 506, the client system sends workload parameters to the workload objects. These parameters are the load per client system, the number of client processes per client system, the run time, the warm-up time, and the file with workload specification. The client, at block 508, then starts the workload object. In response, at block 510, the workload generates a request to the server. Typically the workloads are generated to the server by calling a function workload.do.Op. Workload.do.Op does an operation and then updates a result. The workload object thus keeps track of how many operations have succeeded or failed after the server responds to the client with the result. The server executes the request and sends back to the client the results of the execution. The client then updates the results at block 512 and at block 514 the process 500 is ended.

The separation of client execution and workload components is done by defining a workload application programming interface (API). The workload API includes several functions. One such function is a workload.main_init which is called in the client process for initialization. Other functions are: a workload parent, called in the parent client process for initialization; a workload.child_init, called in the child client process for initialization; a workload.prime_init, called in the prime process for initialization; and a workload.child_init_counters, called to initialize workload result counters when the child transitions from warm-up phase to run phase.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. In a client-server environment including a server and at least one client system, a computer-implemented framework method for server benchmarking, the method comprising the steps of:

a. activating a benchmark manager application program;

b. activating, by said benchmark manager, a benchmark prime program;

c. activating, by said prime program, a system-independent benchmark client program;

d. generating, by the client program, at least one workload request to the server; and e. measuring the server's response to said at least one workload request.

2. The method of claim 1 wherein said generating step comprises the steps of:

a. creating a workload object; and b. passing at least one benchmark parameter to said workload object.

3. The method of claim 2 wherein said generating step further comprises:

a. activating said workload object;

b. generating at least one request by said workload object to said server; and c. updating a benchmark measurements file.

4. The method of claim 2 wherein said step of creating a workload object is independent of the workload protocol.

5. The method of claim 4 wherein said step of creating a workload object includes defining at least one object-oriented interface for said workload object.

6. The method of claim 5 wherein said at least one interface includes byte codes.

7. The method of claim 6 wherein said at least one client system includes an interpreter for translating said byte codes into machine code.

8. The method of claim 7 wherein said interpreter is a Java interpreter.

9. In a client-server environment, a computer network comprising:

a server under test;

at least one client system coupled to said server under test, said at least one client system including a system-independent benchmark client object and a benchmark workload object created by said system independent benchmark client object, said workload object configured to generate at least one workload request to the server; and a prime system coupled to said server and to said at least one client system, said prime system including a benchmark manager object, said benchmark manager configured to activate a benchmark prime object.

10. The computer network of claim 9 wherein said at least one client system configured to measure said server's response to said at least one workload request.

11. The computer network of claim 9 wherein said generation of workloads by said workload object includes:

a. creating a workload object; and b. passing at least one benchmark parameter to said workload object.

12. The computer network of claim 11 wherein said generation of at least one workload request by said workload object further includes:

a. activating said workload object;

b. generating requests by said workload object to said server; and c. updating a benchmark measurements file.

13. The method of claim 11 wherein said creating a workload object is independent of the workload protocol.

14. The computer network of claim 11 wherein the client object configured to create the workload object by defining at least one object-oriented interface for the workload object.

15. The computer network of claim 14 wherein said at least one object-oriented interface includes byte codes.

16. The computer network of claim 15 wherein said client systems include an interpreter for translating said byte codes into machine code.

17. The computer network of claim 16 wherein said interpreter is a Java interpreter.

18. A system configured to exchange information with a prime system and a server coupled thereto, the system comprising:

a storage device storing a system independent benchmark client object and a benchmark workload object created by said system independent benchmark object.

19. The system of claim 18 wherein said benchmark workload object is configured to generate workload requests.

20. The system of claim 19 wherein the system independent benchmark client object configured to create said benchmark workload object independent of a workload protocol.

* * * * *